United States Patent [19]

Haines

[11] Patent Number: 4,605,303

[45] Date of Patent: Aug. 12, 1986

[54] SIMULATOR SCENE DISPLAY EVALUATION DEVICE

[75] Inventor: Richard F. Haines, Los Altos, Calif.

[73] Assignee: The United States of America as represented by the Administrator of the National Aeronautics and Space Administration, Washington, D.C.

[21] Appl. No.: 565,481

[22] Filed: Dec. 22, 1983

[51] Int. Cl.⁴ .......................................... G01N 21/00
[52] U.S. Cl. .................................................. 356/73
[58] Field of Search ............... 356/72, 73, 124, 124.5, 356/125, 138, 152, 399, 400; 434/38, 43, 44

[56] References Cited

U.S. PATENT DOCUMENTS 4,076,420 2/1978 De Maeyer et al. ................. 356/73

Primary Examiner—F. L. Evans
Attorney, Agent, or Firm—Darrell G. Brekke; John R. Manning; Robert D. Marchant

[57] ABSTRACT

An apparatus (10) for aligning and calibrating scene displays in an aircraft simulator (12) has a base (18) on which all of the instruments for the aligning and calibrating are mounted. Laser (26) directs beam (28) at double right prism (34) which is attached to pivoting support (36) on base (18). The pivot point of prism (34) is located at the design eye point (DEP) of simulator (12) during the aligning and calibrating. Objective lens (60) in base (62) is movable on track (64) to follow laser beam (28) at different angles within the field of vision at the DEP. An eyepiece (50) and a precision diopter (56) are movable into position behind the prism (34) during the scene evaluation. A photometer or illuminometer (70) is pivotable about pivot (74) into and out of position behind the eyepiece (50).

7 Claims, 5 Drawing Figures

SIMULATOR SCENE DISPLAY EVALUATION DEVICE

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

This invention relates to an apparatus for aligning, calibrating, and otherwise evaluating simulator scene displays. More particularly, it relates to such an apparatus which will execute a variety of alignment and calibration functions for flight and similar simulator scene displays. In particular, this invention relates to an apparatus which can be used to carry out the following specific calibrations and tests: display bore-sighting with respect to the design eye point (DEP) of a simulator; display scene horizon horizontality checks and adjustment; display scene image sharpness, i.e., optical quality; display scene illuminance and/or luminance at the design eye point; and display scene optical focus distance.

2. Description of the Prior Art

In order for an aircraft to be certified by the Federal Aviation Administration (FAA), the windshield must meet designated size, shape and orientation criteria. The FAA standards speak to the area of view that may be blocked by a centerpost and they specify a minimum "over-the-nose-vertical angle." These standards are referenced to a design eye point, DEP, a specific locus where the pilot's eyes are located when the pilot is seated in the cockpit.

Simulators are judged by their success in achieving realism. Thus, in a flight simulator all major visual design parameters are referenced to the DEP as accurately as possible. In a flight training simulator the X, Y and Z coordinates of the DEP are typically defined by marks on various shell ribs, struts and other surface members. When seated in the simulator, the pilot/trainee uses these marks to orient his eyes with respect to the scene display.

Sophisticated flight simulators often utilize multiple scene displays. In the past, evaluations of the displays relied on the use of multiple instruments, a separate instrument for each type of measurement to be performed. The necessity for precisely positioning the various instruments separately for each different evaluation that must be carried out with each of the several displays is both time consuming and error prone.

There is a need for measurement of total, integrated scene illuminance at the DEP; however, previously it has been customary to stop with a factory measurement of a small area on the face of the CRT.

The conventional way of positioning and aligning each visual scene display at which the pilot looks during a simulated flight and which portrays an impression of the real world is through the use of a theodolite or transit.

The patent of McCrum et al., U.S. Pat. No. 4,139,769, Feb. 13, 1979, reveals a technique for boresight alignment utilizing a collimated beam projector, a vidicon, and a plurality of mirrors. A variety of other alignment and collimating instruments and angle measuring devices are disclosed in the following issued U.S. patents:

U.S. Pat. No. 3,355,979, issued Dec. 5, 1967 to Wirtanen.

U.S. Pat. No. 3,486,826, issued Dec. 30, 1969 to Colvin et al.

U.S. Pat. No. 3,575,512, issued Apr. 20, 1971 to Baboz.

U.S. Pat. No. 3,649,122, issued Mar. 14, 1972 to Holtz.

U.S. Pat. No. 3,762,018, issued Oct. 2, 1973 to Myer.

U.S. Pat. No. 3,836,258, issued Sept. 17, 1974 to Courten et al.

U.S. Pat. No. 3,918,814, issued Nov. 11, 1975 to Weiser.

U.S. Pat. No. 3,966,328, issued June 29, 1976 to Wiklund.

U.S. Pat. No. 4,015,906, issued Apr. 5, 1977 to Sharon.

U.S. Pat. No. 4,191,471, issued Mar. 4, 1980 to Courten et al.

U.S. Pat. No. 4,330,212, issued May 18, 1982 to Miller.

A comprehensive instrument for carrying out a series of different optical measurements of a simulator has hitherto not been provided. A need therefore remains for further improvement for apparatus for aligning, calibrating, and otherwise evaluating optical systems, suitable for meeting the demanding requirements of simulator scene displays.

SUMMARY OF THE INVENTION

Accordingly, it is an object of this invention to provide a single apparatus which will carry out a variety of aligning and calibrating functions for simulator scene displays.

It is another object of the invention to provide an apparatus for aligning and calibrating simulator scene displays without requiring separate precise positioning of different instruments used in the aligning and calibrating.

It is another object of the invention to provide such an apparatus which is easily adjusted to various angles within a field of vision at a point with respect to which the aligning and calibrating is carried out.

It is another object of the invention to provide such an apparatus which is capable of aligning and calibrating for binocular vision as occurs during pilot head rotations.

It is still another object of the invention to provide an apparatus useful for determining the angular orientation of windshield boundaries and windshield posts in vehicles and vehicle simulators.

The attainment of these and related objects may be achieved through use of a novel alignment and calibration apparatus. The elements of the apparatus are mounted on a common base. The apparatus includes a source of collimated light and means for directing the collimated light at selected angles encompassed within a field of vision at a point proximate to the light source. A means is provided for selectively positioning a plurality of scene evaluation instruments at the point. The collimated light source is preferably implemented with a laser. In one form of the invention, the means for directing the collimated light is a double right angle prism pivotally mounted orthogonally to the base. Examples of scene evaluation instruments that can be selectively positioned by the positioning means include a viewing eyepiece and objective lens, an illuminometer and/or photometer, and a dioptometer. By providing such capabilities mounted on a common base, simulator scene displays may be comprehensively evaluated by the precise positioning of a single apparatus. As a result, positioning errors are reduced and the time required for evaluating scene displays is substantially reduced.

The attainment of the foregoing and related objects, advantages and features of the invention should be more readily apparent to those skilled in the art, after review of the following more detailed description of the invention, taken together with the drawings, in which:

DETAILED DESCRIPTION OF THE INVENTION

Figure 1:
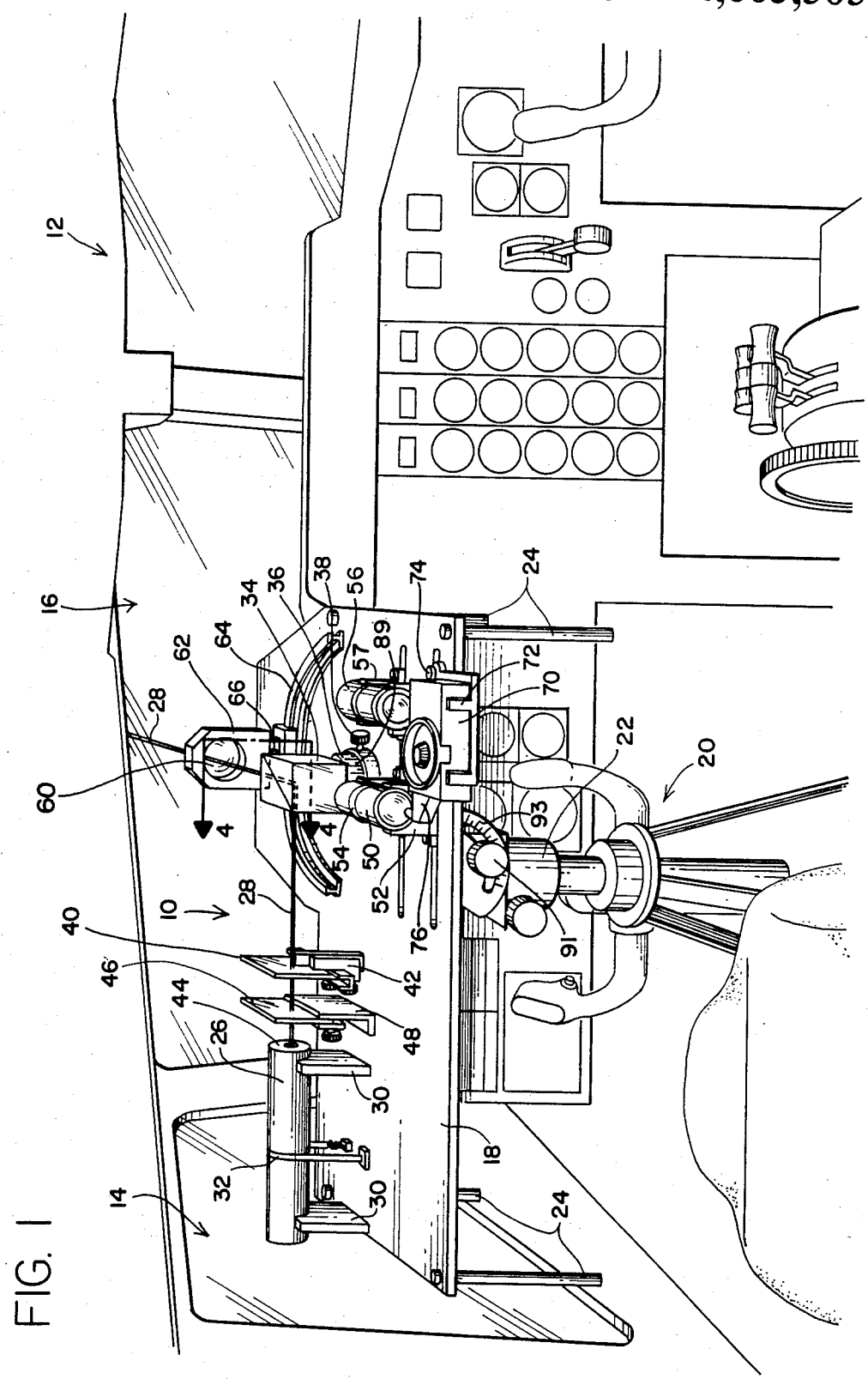
FIG. 1 is a perspective view of an apparatus in accordance with the invention.

Turning now to the drawings, more particularly to FIG. 1, there is shown an apparatus 10 in accordance with the invention in place in an aircraft flight simulator 12 for aligning and calibrating scene displays provided through windows 14 and 16 of the simulator 12. The apparatus 10 has a base 18 which is mounted on a tripod 20 by means of an adjusting head 22, which allows the base 18 to be adjusted angularly in the horizontal (X,Y) and vertical (Z) directions. Removable support legs 24 are also provided on the base 18 to allow the apparatus to be placed on a table top or to be differentially tilted at inclined angles.

A low power, helium-neon laser tube 26, which produces a red laser beam 28, is fixedly supported on the base 18 by means of cradle supports 30 and a spring loaded tie down strap 32. A glass, cemented double right prism 34 possessing low reflectivity at the interface between the prisms is mounted on a rotatable, angularly graduated support 36 having thumb lock 38. The support 36 is in turn fixedly attached to base 18. The support 36 allows prism 34 to be rotated to desired angular positions with an accuracy of up to 0.25 degrees. The apparatus 10 is positioned in the simulator 12 with the center of rotation of prism 34 at the DEP, so that only prism 34 need be rotated to project laser beam 28 in different directions during alignment of scene displays.

An aperture plate 40 is mounted on a Y-Z adjustable microscope stage 42, which is fixedly attached to the base 18. The aperture plate 40 contains small diameter apertures, which are aligned between the laser 26 output end 44 and the glass prism 34, in order to vary and control the beam diameter and/or shape. The microscope stage 42 allows the aperture plate 40 to be precisely positioned to center a chosen aperture over the laser beam 28. If desired, the stage 42 can also be used to hold various optical lenses (not shown), which may be either clear or frosted, and which are used to diverge the laser beam 28.

A neutral variable density filter 46 is also supported in the path of laser beam 28 by a clamp 48, also fixedly attached to the base 18. The filter 46 adjusts and controls the effective intensity of the laser beam 28. The clamp 48 allows the filter to be manually positioned at any required position in the slot to increase or reduce the beam's intensity. A viewing eyepiece 50 is supported on one side of the prism 34, slightly behind the DEP in a support cradle 52 by means of a nylon, spring loaded tie-down strap 54. The support cradle 52 is slidably mounted on the base 18, so that a dioptometer 56, similarly supported in a support cradle 57 may be moved to the position of the eyepiece 50 as shown for evaluation and measurement of optical focus distance. The eyepiece 50 and the dioptometer 56 may also be moved to the right away from prism 34 to allow direct visual observation along the reflected laser beam from the prism 34.

A telescope objective lens 60 is mounted on a support 62, which may be positioned along track 64, which is in the form of an arc of a circle having a radius of curvature equal to the distance from the DEP. The objective lens 60 has its center on a line passing through the center of prism 34 and the eyepiece 50. Knob 66 allows precise image focus.

A battery powered illuminometer or photometer 70 is mounted on a support bracket 72, which is pivotally fastened to the base 18 at point 74. In the position shown, photosensitive head 76 of the photometer 70 lies precisely at the location of a human observer's pupil behind eyepiece 50. When not in use the photometer 70 is rotated about pivot 74 into an out-of-axis location.

Figure 2:
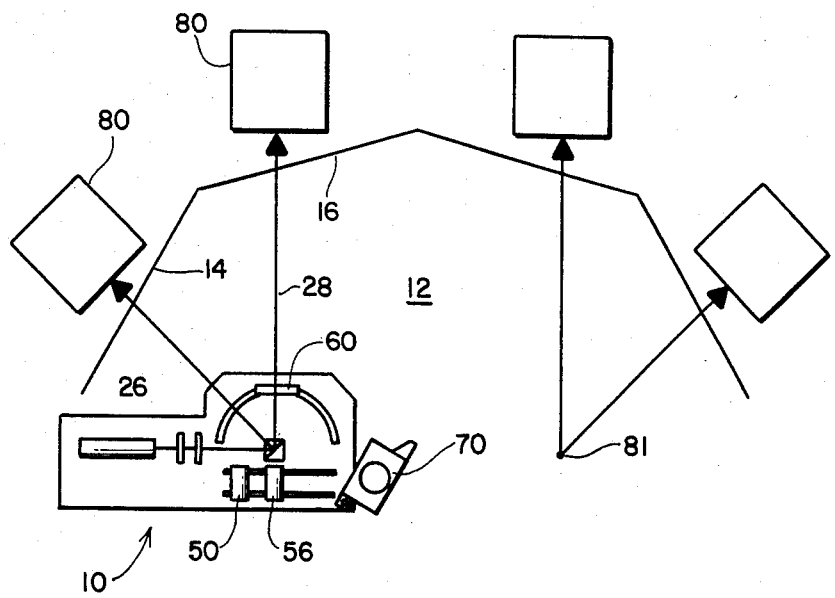
FIG. 2 is a plan view of the apparatus shown in FIG. 1 in a vehicle simulator intended for use by two side-by-side trainees.

FIG. 2 shows the apparatus 10 of FIG. 1 with the dioptometer 56 in position behind the DEP and the photometer 70 pivoted into its out-of-axis location. FIG. 2 also shows placement of cathode ray tube, beam splitter and spherical mirror assemblies 80 with respect to simulator 12. The assemblies 80 provide external scene displays through the simulator cockpit windows 14 and 16. Point 81 represents the DEP of a second simulator operator.

Figure 3:
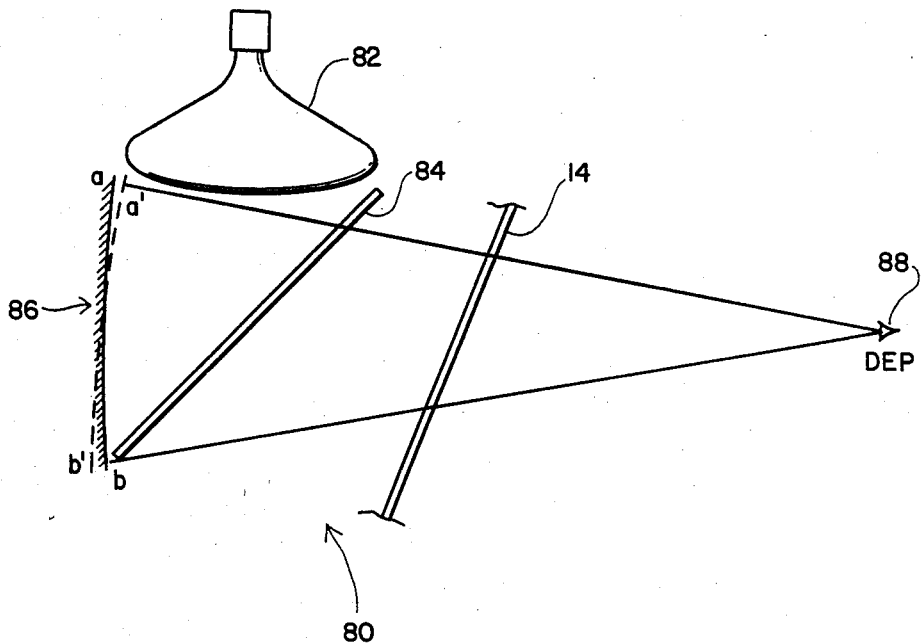
FIG. 3 is a view of a flight simulator optical system of a type that is calibrated with the instrument of FIGS. 1-2.

Further details of the assemblies 80 are shown in FIG. 3. CRT 82 is positioned so that partially reflecting beam splitter 84 will project an image from the face of tube 82 to spherical mirror 86 for projection through windshield 14 to DEP 88. The spherical mirror 86 enlarges the image on CRT tube 82 so that it very closely simulates a distant real world scene as would be observed from a cockpit of an actual aircraft. The assembly 80 also allows laser beam 28 to be reflected back through prism 34 during an alignment operation. The spherical mirror 86, at position a-b, has an optical radius to produce the required image at the DEP 88. The laser beam 28 is used to adjust the tilt of spherical mirror 86. As the collimated light beam passes through the optical system a dot is produced at each interface (air-to-glass). When the spherical mirror 86 and cathode ray tube 82 are correctly positioned relative to beam splitter 84 and DEP 88, the viewer will observe all of the dots superimposed. When the optical system is out of alignment, for example when the mirror is in position a'-b', the distribution of the dots will reveal the direction and amount of adjustment needed to bring about alignment.

For measuring the angular extents of the scene display or the windshield, only laser 26 and the prism 34 shown in FIG. 1 are required. Eyepiece 54 is moved to the right so that user can sight visually directly along the laser beam 28. With base 18 mounted horizontally, horizontal angles of the optical system 80 can be measured to within about 0.25 degrees on graduation scale 89. By adjusting base 18 into a vertical position with knob 91 and scale 93, vertical angles can be determined using scale 89 with the same degree of accuracy. For these measurements, the objective lens 60 is moved out of position.

With the objective lens 60 in place to intercept laser beam 28 and eyepiece 50 behind the prism 34, the display system 80 is appropriately magnified and can be adjusted for best image quality. As the prism 34 is rotated to direct the laser beam 28 at different angles, the objective lens 60 is positioned equivalently by moving its holder 62 along track 64, but the eyepiece 50 remains stationary behind the DEP. The user need only view the cathode ray tube 82 image with a suitable resolution test pattern or grid network on the display to evaluate the best CRT electronic focus adjustment. CRT spot size and color convergence is adjusted in the same manner.

Figure 4:
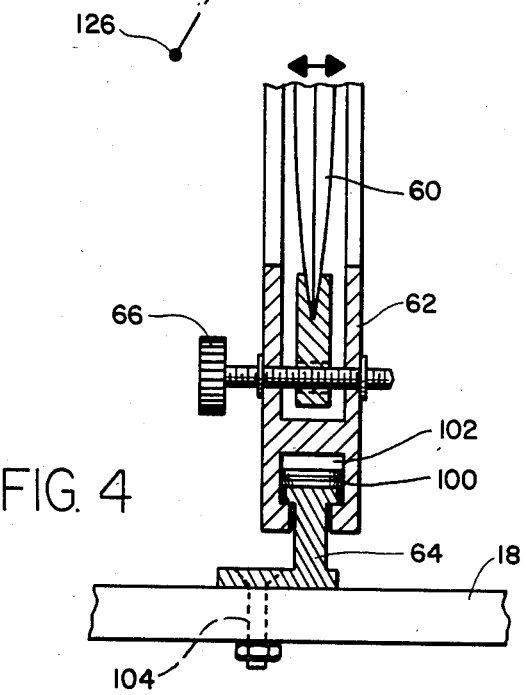
FIG. 4 is a cross section view of a portion of the apparatus shown in FIG. 1, taken along the line 4—4.

FIG. 4 shows further details of track 64 and holder 62 for moving objective lens 60 to coincide with the laser beam 28 as it is reflected by the prism 34. A spring loaded bearing 100 is positioned within cavity 102 of the support 62. Semi-circular track 64 is fixed to base 18 by bolts 104 or other suitable fasteners.

With the precision dioptometer 56 moved into position behind the DEP, the apparatus 10 can be used for calibrating the optical focal distance of the CRT image accurately and quickly.

For all of the above test functions, more than one display system 80, such as is found on many commercial airline training simulators, may be calibrated simply by rotating the prism 34, without affecting any of the critical linear distances involved. Thus, the apparatus 10 need be positioned only once for each DEP evaluated.

Figure 5:
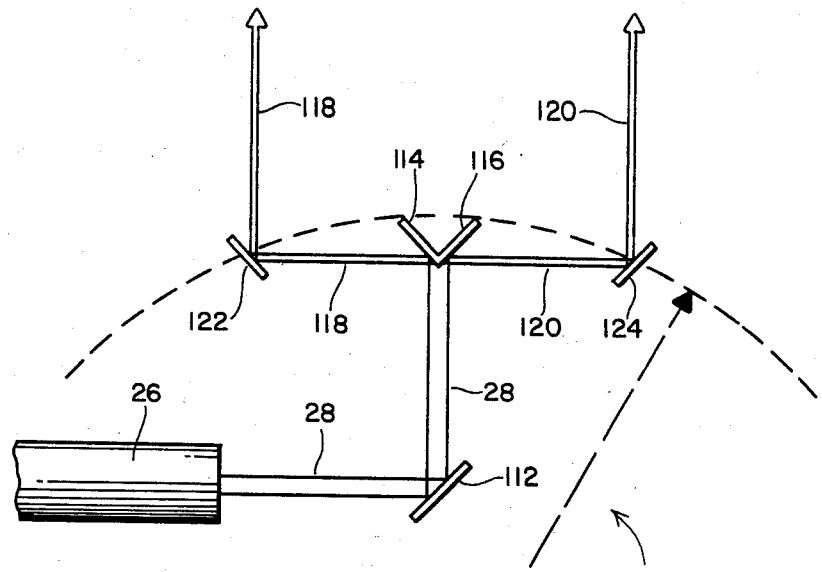
FIG. 5 is a top view of another embodiment of the invention.

FIG. 5 shows a portion of a binocular version of an apparatus 110 in accordance with the invention. Laser 26 directs beam 28 at a first surface mirror 112, which directs the laser beam 28 to edge-bevelled mirrors 114 and 116, which split the laser beam 28 into two beams 118 and 120. Beams 118 and 120 are redirected parallel to one another at a separation spacing of approximately 2.5 inches, representing the mean human interpupillary separation dimension, by mirrors 122 and 124. Mirrors 112, 116 and 124 are all parallel. Likewise mirrors 114 and 122 are parallel. The mirrors 112, 114, 116, 122 and 124 are mounted to pivot as a unit about pivot point 126, located 3.312 inches behind a circular arc passing through the center of mirrors 122 and 124. If desired, the mirrors 112, 114, 116, 122 and 124 may be removably positioned between the laser output end 44 and prism 34 of the FIG. 1 embodiment, in order to provide both single beam and binocular beam capabilities for the apparatus 10.

The apparatus 10 as shown in FIG. 1 is suitable for most initial installation alignment checks. However, with the pivot point 126 mounted so that the center of rotation for directing the laser beam 28 at different angles is placed as in FIG. 5, the pivoting to redirect the laser beam 28 will correspond to that of a pilot's head with his eyes in the correct DEP and the spinal pivot point behind the eyeballs. This form of the invention corresponds to published U.S. Department of Transportation requirements.

The binocular apparatus 110 shown in FIG. 5 allows the calibration to correspond to the pilot's left and right eye line of sight. This embodiment permits such design features of the simulator's optical system as window post location versus mirror edges to be evaluated. Each of the pilot's eyes can see around a cockpit window post to some extent in an aircraft permitting him to perceive external scene detail lying behind the post monocularly. A good visual scene display system for use on simulators should also provide this visual detail.

In practice, use of the apparatus of this invention allows alignment and calibration of an aircraft or similar simulator scene displays as described above in less than an hour. Using separate instruments to perform the same alignment and calibration often requires a full day.

It should now be readily apparent to those skilled in the art that a simulator scene display alignment and calibration apparatus capable of achieving the stated objects of the invention has been provided. The single apparatus of this invention carries out a variety of aligning and calibrating functions for simulator scene displays. As a result, separate precise positioning of different instruments is not required. The apparatus is placed in position at a DEP, and aligning and calibrating functions carried out at different angles by pivoting a portion of the apparatus. If desired, the apparatus may allow evaluation of either monocular or binocular vision.

It should further be apparent to those skilled in the art that various changes in form and details of the invention as shown and described may be made. It is intended that such changes be included within the spirit and scope of the claims appended hereto.

What is claimed is:

1. Apparatus for evaluating simulator scene display alignment and calibration, which comprises, a base, a source of collimated light mounted on said base, means mounted on said base for directing the collimated light at selected angles encompassed within a field of vision at a point proximate to said light source, a plurality of scene evaluation instruments mounted on said base and means mounted on said base for selectively positioning said plurality of scene evaluation instruments at the point by moving each of said plurality of scene evaluation instruments to and away from the point.

2. The apparatus of claim 1 in which said collimated light source comprises a laser.

3. The apparatus of claim 1 in which said means for directing the collimated light comprises a double right prism pivotally mounted orthogonally to said base.

4. The apparatus of claim 1 in which said means for directing the collimated light comprises a pair of edge-beveled mirrors for splitting the collimated light into two beams and an additional mirror for each beam to direct the two beams in a parallel path, said mirrors being pivotally mounted orthogonally to said base.

5. The apparatus of claim 1 in which said selective positioning means movably supports a viewing eyepiece as one of said plurality of scene evaluation instruments and said apparatus includes a means mounted on said base for supporting an objective lens in the field of vision, said objective lens being movable angularly within the field of vision.

6. The apparatus of claim 5 in which said selective positioning means pivotally supports a photometer as one of said plurality of scene evaluation instruments.

7. The apparatus of claim 6 in which said selective positioning means movably supports a dioptometer as one of said plurality of scene evaluation instruments.

* * * * *